United States Patent [19]

Biesmans

[11] Patent Number: 5,990,184
[45] Date of Patent: Nov. 23, 1999

[54] POLYISOCYANATE BASED AEROGEL

[75] Inventor: Guy Leon Jean Ghislain Biesmans, Everberg, Belgium

[73] Assignee: Imperial Chemical Industries PLC, London, United Kingdom

[21] Appl. No.: 09/052,190

[22] Filed: Mar. 31, 1998

[30] Foreign Application Priority Data

Apr. 1, 1997 [EP] European Pat. Off. .............. 97105359

[51] Int. Cl.$^6$ .............................. C08J 9/28; C08G 18/16; C08G 18/22; C08L 61/00

[52] U.S. Cl. ................... 521/64; 521/61; 521/62; 521/63; 521/82; 521/93; 521/94; 521/97; 521/125; 521/128; 521/130; 521/136; 521/137; 521/155; 521/158; 521/170; 521/902

[58] Field of Search .................................. 511/61, 62, 63, 511/64, 93, 82, 94, 97, 136, 137, 902, 125, 128, 130, 155, 158, 170

[56] References Cited

U.S. PATENT DOCUMENTS

| | | | |
|---|---|---|---|
| 5,066,684 | 11/1991 | LeMay | 521/64 |
| 5,081,163 | 1/1992 | Pekala | 521/187 |
| 5,086,085 | 2/1992 | Pekala | 521/187 |
| 5,116,883 | 5/1992 | LeMay | 521/178 |
| 5,420,168 | 5/1995 | Mayer et al. | 521/99 |
| 5,476,878 | 12/1995 | Pekala | 521/61 |
| 5,478,867 | 12/1995 | Tabor | 521/163 |
| 5,484,818 | 1/1996 | De Vos et al. | 521/123 |
| 5,869,545 | 2/1999 | Biesmans et al. | 521/117 |

FOREIGN PATENT DOCUMENTS

| | | |
|---|---|---|
| 19505046 | 8/1996 | Germany . |
| 95/02009 | 1/1995 | WIPO . |
| 95/03358 | 2/1995 | WIPO . |
| 96/20822 | 7/1996 | WIPO . |
| 96/36654 | 11/1996 | WIPO . |
| 96/37539 | 11/1996 | WIPO . |

*Primary Examiner*—Rabon Sergent
*Attorney, Agent, or Firm*—Pillsbury Madison & Sutro Intellectual Property Group

[57] ABSTRACT

Process for making polyisocyanate based aerogels by trimerisation of an organic polyisocyanate in an organic solvent in the presence of a (co)polymer containing an isocyanate-reactive group, gellation and supercritically drying of the obtained sol-gel.

18 Claims, No Drawings

POLYISOCYANATE BASED AEROGEL

The present invention relates to polyisocyanate based aerogels and to methods for their preparation.

Aerogels are a unique class of ultrafine cell size, low density, open-celled foams. Aerogels have continuous porosity and their microstructure with pore sizes below the free mean path of air (pore sizes in the nanometer range) is responsible for their unusual thermal properties. More in depth understanding of the aerogel texture and terminology can be found in the following references: D. Schaefer, "Structure of mesoporous aerogels", MRS Bulletin, April 1994, p. 49–53; R. W. Pekala, D. W. Schaefer, "Structure of organic aerogels. 1. Morphology and Scaling", Macromolecules 1993, 26, p. 5487–5493; M. Foret, A. Chougrani, R. Vacker, J. Pelous, "From colloidal-silica sols to aerogels and xerogels", Journal de Physique IV, Colloque C2, supplement au Journal de Physique III, Volume 2, October 1992, p. 135–139; R. W. Pekala, C. T. Alviso, "Carbon aerogels and xerogels", Mat. Res. Soc. Symp. Proc. Vol. 270, 1992, p. 9; Journal of Non Crystalline Solids, Vol. 186, Jun. 2, 1995, Chapter 1.

Organic aerogels based on polyisocyanate chemistry are described in WO 95/03358, WO 96/36654 and WO 96/37539.

They are prepared by mixing a polyisocyanate and a catalyst in a suitable solvent and maintaining said mixture in a quiescent state for a sufficiently long period of time to form a polymeric gel. The gel so formed is then supercritically dried.

During a fast supercritical drying process the gel shrinks substantially leading to an increase in density of the obtained aerogel.

Therefore it is an object of the present invention to provide a method for preparing polyisocyanate-based organic aerogels of lower density.

Accordingly, the present invention provides a method for preparing a polyisocyanate based organic aerogel comprising the steps of a) mixing an organic polyisocyanate and an isocyanate trimerisation catalyst in a suitable solvent, b) maintaining said mixture in a quiescent state for a sufficiently long period of time to form a polymeric gel, and c) supercritcally drying the obtained gel, wherein a (co)polymer containing at least one isocyanate-reactive group is mixed with the other ingredients in step a).

The isocyanate-reactive group present in the co(polymer) is an OH, COOH, $NH_2$ or NHR group, preferably an OH group.

Examples of suitable classes of (co)polymers are polyacrylates, polystyrenics, polyketones, bisphenol A resins, hydrocarbon resins, polyesters, polyaldehyde-keton resins, resols, novolaks, neutral phenolic resins, polymethacrylates, polyacrylonitrile, polyvinylacetate, PET derivatives, polyamides, cellulose, polyethers, modified polyethylene and polypropylene, polybutadienes and alkyd resins.

A particularly preferred class of (co)polymers are those derived from ethylenically unsaturated monomers; preferred are styrene, acrylic acid and acrylic acid ester derivatives such as methylacrylate esters, hydroxyacrylate esters and partially fluorinated acrylate esters.

Another preferred class of (co)polymers are those obtained by condensation of aldehydes (preferably formaldehyde) and/or ketones such as phenolic resins, particularly neutral phenolic resins, polyaldehyde-keton resins, polyketones, novolaks, and resols.

Preferably the (co)polymer for use in the present invention has an OH value of between 30 and 800 mg KOH/g, preferably between 100 and 500 mg KOH/g and a glass transition temperature of between −50 and 150° C., preferably between 0 and 80° C. The molecular weight of the (co)polymer is preferably between 500 and 10000, more preferably between 4000 and 6000. The (co)polymer has preferably a melt range of 60 to 160° C.

Optimal results are generally obtained when the aromaticity of the (co)polymer is at least 15%; the aromaticity being calculated as 7200× number of aromatic moieties in the polymer/number average molecular weight.

Preferred (co)polymers for use in the present invention are copolymers of styrene and hydroxyacrylate and optionally also acrylate.

Such copolymers are commercially available, for example, Reactol 180, Reactol 255 and Reactol 100 (all available from Lawter International). Other preferred (co)polymers which are commercially available from Lawter International are K 1717 (a polyketone), Biresol (a bisphenol A resin), K 2090 (a polyester), K 1717B (an aldehyde-ketone resin) and K 1111 (a neutral phenolic resin).

The (co)polymers are used in the present process preferably in such an amount that the ratio between functional groups in the polyisocyanate (NCO) and in the (co)polymer (OH) is between 1:1 and 10:1, preferably between 3:1 and 7:1.

By using the above (co)polymers in the preparation process monolith aerogel blocks are obtained having lower densities than the polyisocyanate aerogels of the prior art.

Densities of the aerogels obtained by using the process of the present invention are generally in the range 1 to 1000 $kg/m^3$, more generally in the range 10 to 800 $kg/m^3$ and even more generally in the range 20 to 400 $kg/m^3$ or even 30 to 300 $kg/m^3$ or even 50 to 150 $kg/m^3$.

The aerogels prepared according to the process of the present invention generally have pore sizes in the range 1 to 100 nm, more generally in the range 5 to 50 nm and even more generally in the range 5 to 25 nm.

Surface areas of the aerogels prepared according to the process of the present invention are generally in the range 1 to 1500 $m^2/g$, more generally in the range 5 to 1200 $m^2/g$ and even more generally in the range 10 to 800 $m^2/g$ or even 15 to 500 $m^2/g$.

Polyisocyanates for use in the present method for preparing the polyisocyanate-based aerogels include aliphatic, cycloaliphatic, araliphatic and aromatic polyisocyanates known in the literature for use generally in the production of polyurethane/polyisocyanurate materials. Of particular importance are aromatic polyisocyanates such as tolylene and diphenylmethane diisocyanate in the well known pure, modified and crude forms, in particular diphenylmethane diisocyanate (MDI) in the form of its 2,4'-, 2,2'- and 4,4'-isomers (pure MDI) and mixtures thereof known in the art as "crude" or polymeric MDI (polymethylene polyphenylene polyisocyanates) having an isocyanate functionality of greater than 2 and the so-called MDI variants (MDI modified by the introduction of urethane, allophanate, urea, biuret, carbodiimide, uretonimine or isocyanurate residues).

The polyisocyanate is used in amounts ranging from 0.5 to 30% by weight, preferably from 1.5 to 20% by weight and more preferably from 3 to 15% by weight based on the total reaction mixture.

Trimerisation catalysts for use in the present preparation method include any isocyanate trimerisation catalyst known in the art such as quaternary ammonium hydroxides, alkali metal and alkaline earth metal hydroxides, alkoxides and carboxylates, for example potassium acetate and potassium 2-ethylhexoate, certain tertiary amines and non-basic metal carboxylates, for example lead octoate, and symmetrical triazine derivatives. Specific preferred trimerisation catalysts for use in the present method are Polycat 41 available from Abbott Laboratories, and DABCO TMR, TMR-2, TMR-4 and T 45 available from Air Products, and potassium salts like potassium octoate and potassium hexanoate.

In addition to the trimerisation catalyst a urethane catalyst as known in the art may be used.

The polyisocyanate/catalyst weight ratio varies between 5 and 1000, preferably between 5 and 500, most preferably between 10 and 100.

The preferred polyisocyanate/catalyst weight ratio depends on the amount of polyisocyanate used, the reaction/cure temperature, the solvent used, additives used.

The solvent to be used in the preparation method according to the present invention should be a solvent for the (co)polymer, catalyst and monomeric (non-reacted) polyisocyanate as well as for the polymeric (reacted) polyisocyanate. The solvent power should be such as to form a homogeneous solution of non-reacted compounds and to dissolve the reaction product or at least prevent flocculation of the reaction product. Solvents with a $\delta$ solubility parameter between 0 and 25 $MPa^{1/2}$ and a hydrogen bonding parameter $\delta_H$ between 0 and 15 $MPa^{1/2}$ are most suitable.

Suitable solvents for use in the method according to the present invention include hydrocarbons, dialkyl ethers, cyclic ethers, ketones, alkyl alkanoates, aliphatic and cycloaliphatic hydrofluorocarbons, hydrochlorofluorocarbons, chlorofluorocarbons, hydrochlorocarbons, halogenated aromatics and fluorine-containing ethers. Mixtures of such compounds can also be used.

Suitable hydrocarbon solvents include lower aliphatic or cyclic hydrocarbons such as ethane, propane, n-butane, isobutane, n-pentane, isopentane, cyclopentane, neopentane, hexane and cyclohexane.

Suitable dialkyl ethers to be used as solvent include compounds having from 2 to 6 carbon atoms. As examples of suitable ethers there may be mentioned dimethyl ether, methyl ethyl ether, diethyl ether, methyl propyl ether, methyl isopropyl ether, ethyl propyl ether, ethyl isopropyl ether, dipropyl ether, propyl isopropyl ether, diisopropyl ether, methyl butyl ether, methyl isobutyl ether, methyl t-butyl ether, ethyl butyl ether, ethyl isobutyl ether and ethyl t-butyl ether.

Suitable cyclic ethers include tetrahydrofuran.

Suitable dialkyl ketones to be used as solvent include acetone, cyclohexanone, methyl t-butyl ketone and methyl ethyl ketone.

Suitable alkyl alkanoates which may be used as solvent include methyl formate, methyl acetate, ethyl formate, butylacetate and ethyl acetate.

Suitable hydrofluorocarbons which may be used as solvent include lower hydrofluoroalkanes, for example difluoromethane, 1,2-difluoroethane, 1,1,1,4,4,4-hexafluorobutane, pentafluoroethane, 1,1,1,2-tetrafluoroethane, 1,1,2,2-tetrafluoroethane, pentafluorobutane and its isomers, tetrafluoropropane and its isomers and pentafluoropropane and its isomers. Substantially fluorinated or perfluorinated (cyclo)alkanes having 2 to 10 carbon atoms can also be used.

Suitable hydrochlorofluorocarbons which may be used as solvent include chlorodifluoromethane, 1,1-dichloro-2,2,2-trifluoroethane, 1,1-dichloro-1-fluoroethane, 1-chloro-1,1-difluoroethane, 1-chloro-2-fluoroethane and 1,1,1,2-tetrafluoro-2-chloroethane.

Suitable chlorofluorocarbons which may be used as solvent include trichlorofluoromethane, dichlorodifluoromethane, trichlorotrifluoroethane and tetrafluorodichloroethane.

Suitable hydrochlorocarbons which may be used as solvent include 1- and 2-chloropropane and dichloromethane.

Suitable halogenated aromatics include monochlorobenzene and dichlorobenzene.

Suitable fluorine-containing ethers which may be used as solvent include bis-(trifluoromethyl) ether, trifluoromethyl difluoromethyl ether, methyl fluoromethyl ether, methyl trifluoromethyl ether, bis-(difluoromethyl) ether, fluoromethyl difluoromethyl ether, methyl difluoromethyl ether, bis-(fluoromethyl) ether, 2,2,2-trifluoroethyl difluoromethyl ether, pentafluoroethyl trifluoromethyl ether, pentafluoroethyl difluoromethyl ether, 1,1,2,2-tetrafluoroethyl difluoromethyl ether, 1,2,2,2-tetrafluoroethyl fluoromethyl ether, 1,2,2-trifluoroethyl difluoromethyl ether, 1,1-difluoroethyl methyl ether, 1,1,1,3,3,3-hexafluoroprop-2-yl fluoromethyl ether.

Preferred solvents for use in the method according to the present invention are dichloromethane, methyl ethyl ketone, acetone, tetrahydrofuran, monochlorobenzene, trichlorofluoromethane (CFC 11), chlorodifluoromethane (HCFC 22), 1,1,1-trifluoro-2-fluoroethane (HFC 134a), 1,1-dichloro-1-fluoroethane (HCFC 141b) and mixtures thereof such as HCFC 141b/CFC 11 mixtures, 1,1,1,3,3-pentafluoropropane (HFC245fa), 1,2-difluoroethane (HFC 152), difluoromethane (HFC 32) and 1,1,1,3,3-pentafluorobutane (HFC 365mfc).

Another suitable solvent is liquid carbondioxide ($CO_2$). Liquid carbondioxide may be used under various pressures (above 63 bar) and temperatures. Also sub- or supercritical carbondioxide can be used as a solvent. The solvent power of sub- or supercritical carbondioxide can be adjusted by adding suitable modifiers such as lower alkanes ($C_1$–$C_4$), methanol, ethanol, acetone, HCFC 22, dichloromethane in levels of 0.1 to 50% by volume.

In case liquid carbondioxide is used as solvent it has been shown to be an advantage to use as polyisocyanate in the preparation of the present aerogels a fluorinated isocyanate-ended prepolymer made from a polyisocyanate and a fluorinated isocyanate-reactive compound such as a fluorinated monol or diol.

Alternatively sub- or supercritical hydrofluorocarbons may be used as sole solvent or admixed with $CO_2$.

A solution is made of the polyisocyanate, the (co)polymer, and the solvent. Subsequently the catalyst is added hereto. Alternatively the polyisocyanate and the (co)polymer is dissolved in a marginal part of the solvent; subsequently a solution of the catalyst in the residual amount of solvent is added hereto.

Mixing can be done at room temperature or at somewhat higher temperatures.

In case of low boiling solvents (boiling point below room temperature), for example HCFC 22, the solvent containing the catalyst is added to a pressure vessel containing the polyisocyanate and the (co)polymer under its own vapour pressure.

The solids content of the reaction mixture is preferably between 2 and 30% by weight, more preferably between 4 and 20% by weight, most preferably between 5 and 15% by weight.

By using the above (co)polymers in the process for making aerogels lower solid contents can be used leading to lower density aerogels.

Thereafter the mixture is left standing for a certain period of time to form a polymeric gel. This time period varies from 10 seconds to several weeks depending on the system and the targeted void size and density. Reaction mixtures of the present invention containing the (co)polymer form a sol-gel quicker than those of the prior art not containing said copolymer. In general gelation is obtained in less than one hour. In addition more polar solvents can be used or solvents having a better miscibility with liquid carbondioxide.

Temperatures in the range of from about −50° C., to about 50° C., preferably 0 to 45° C. may be employed.

In the case of low boiling solvents such as HCFC 22 the pressure in the closed vessel is maintained at its saturated vapour pressure and the gelation reaction is carried out at higher temperatures (preferably in the range 30 to 50° C.). At these elevated reaction temperatures DABCO TMR is the preferred trimerisation catalyst.

Although the mixture gels within a few minutes, it has been found to be advantageous to cure the gels for a minimum of 24 hours so as to obtain a solid gel that can be easily handled in subsequent processing.

A postcure cycle at elevated temperatures can be included.

Supercritical drying of the aerogels involves placing the solvent-filled gel in a temperature-controlled pressure vessel and bringing the vessel to a pressure above the critical pressure of the solvent (for example by filling with nitrogen gas or pumping additional solvent). At that point the vessel is then heated above the critical temperature of the solvent. After a few hours the pressure is slowly released from the vessel while keeping a constant temperature. At atmospheric pressure and after a cool down period the aerogel is removed from the vessel.

Before the supercritical drying step the gel may be exchanged into a solvent more suitable for supercritical drying, for example liquid carbondioxide, possibly via an intermediate solvent such as acetone or via liquid carbondioxide containing modifiers.

During supercritical drying the aerogel can be formed into a suitable shape by applying mechanical loads in the pressure vessel.

In order to further improve the structural integrity and the handling of the aerogel monoliths a reinforcement material can be incorporated in the sol-gel process, preferably in an amount of between 0.05 and 30% by weight on polymer. Examples of suitable reinforcement materials include glass fibre, glass mat, felt, glass wool, carbon fibre, boron fibre, ceramic fibre, rayon fibre, nylon fibre, olefin fibre, alumina fibre, asbestos fibre, zirconia fibre, alumina, clay, mica, silicas, calcium carbonate, talc, zinc oxide, barium sulfates, wood and shell floor, polystyrene. Alternatively woven fibres or mats can be used at the bottom and/or top of the mould in which the monolith is cast to give structural strength. An examples of such a woven fibre is Tyvec (available from Dupont).

Further suitable additives to be used in the process of the present invention and further suitable processing methods are described in WO 95/03358, WO 96/36654 and WO 96/37539, all incorporated herein by reference.

The obtained aerogels can be used for thermal insulation as in construction or appliances and/or sound insulation applications.

The present invention is illustrated but not limited by the following examples in which the following ingredients were used:

Reactol 180: a (hydroxy)acrylate/styrene copolymer available from Lawter International, having an OH value of 180 mg KOH/g.

Reactol 255: a (hydroxy)acrylate/styrene copolymer available from Lawter International, having an OH value of 255 mg KOH/g.

Reactol 100: a (hydroxy)acrylate/styrene copolymer available from Lawter International, having an OH value of 100 mg KOH/g.

K 1111: a neutral phenolic resin of OH value 342 mg KOH/g, available from Lawter International.

SUPRASEC X2185: a polymeric isocyanate available from Imperial Chemical Industries.

SUPRASEC DNR: a polymeric isocyanate available from Imperial Chemical Industries.

Dabco TMR: a trimerisation catalyst available from Air Products.

Polycat 41: a trimerisation catalyst available from Air Products.

acetone: Rathburn-glass distilled grade.

SUPRASEC is a trademark of Imperial Chemical Industries.

EXAMPLE 1

In a recipient, 2.15 grams of Reactol 180 were dissolved in 94.9 grams of acetone. To this mixture 2.85 grams of SUPRASEC X2185 were blended until a homogeneous solution was obtained. To this solution 0.142 mls of Dabco TMR were injected by means of a syringe. The recipient was closed air tight and shaken thoroughly to ensure a good distribution of the catalyst through the liquid.

The solution was then isolated at ambient conditions for 1 hour to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 65 kg/m$^3$, surface area 10 m$^2$/g, lambda initial 7 mW/mK, lambda air 49 mW/mK, critical pressure 4 mBar.

Density (envelope density) was measured on a Micromeretics Geopyc 1360. Surface area was measured on a Micromeretics Gemini (BET $N_2$ adsorption). Lambda was measured according to standard ASTM C518; Lambda initial at a pressure of below 0.1 mbar, Lambda air at atmospheric pressure. Critical pressure is the pressure at which the Lambda/log pressure curve deviates from a flat line.

EXAMPLE 2

In a recipient, 1.56 grams of Reactol 180 were dissolved in 94.8 grams of acetone. To this mixture 3.44 grams of SUPRASEC X2185 were blended until a homogeneous solution was obtained. To this solution 0.172 mls of Dabco TMR were injected by means of a syringe. The recipient was closed air tight and shaken thoroughly to ensure a good distribution of the catalyst through the liquid.

The solution was then isolated at ambient conditions and gelled in 25 minutes.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 65 kg/m$^3$, surface area 5 m$^2$/g, lambda initial 8 mW/mK, lambda air 56 mW/mK, critical pressure 2 mBar.

EXAMPLE 3

In a recipient, 3.02 grams of Reactol 180 were dissolved in 92.9 grams of acetone. To this mixture 3.98 grams of SUPRASEC X2185 were blended until a homogeneous solution was obtained. To this solution 0.099 mls of Dabco TMR were injected by means of a syringe. The recipient was closed air tight and shaken thoroughly to ensure a good distribution of the catalyst through the liquid.

The solution was then isolated at ambient conditions for 20 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 101 kg/m$^3$, surface area 26 m$^2$/g, lambda initial 6 mW/mK, lambda air 35 mW/mK, critical pressure 8 mBar.

EXAMPLE 4

In a recipient, 2.19 grams of Reactol 180 were dissolved in 92.9 grams of acetone. To this mixture 4.81 grams of SUPRASEC X2185 were blended until a homogeneous solution was obtained. To this solution 0.120 mls of Dabco TMR were injected by means of a syringe. The recipient was closed air tight and shaken thoroughly to ensure a good distribution of the catalyst through the liquid.

The solution was then isolated at ambient conditions for 10 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 96 kg/m$^3$, surface area 8 m$^2$/g, lambda initial 7 mW/mK, lambda air 44 mW/mK, critical pressure 6 mBar.

EXAMPLE 5

In a recipient, 1.71 grams of Reactol 180 were dissolved in 92.9 grams of acetone. To this mixture 5.29 grams of SUPRASEC X2185 were blended until a homogeneous solution was obtained. To this solution 0.132 mls of Dabco TMR were injected by means of a syringe. The recipient was closed air tight and shaken thoroughly to ensure a good distribution of the catalyst through the liquid.

The solution was then isolated at ambient conditions for 5 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 92 kg/m$^3$, lambda initial 7 mW/mK, lambda air 48 mW/mK, critical pressure 4 mBar.

EXAMPLE 6

In a recipient, 6.16 grams of Reactol 255 were dissolved in 89.9 grams of acetone. To this mixture 3.84 grams of SUPRASEC X2185 were blended until a homogeneous solution was obtained. To this solution 0.076 mls of Dabco TMR were injected by means of a syringe. The recipient was closed air tight and shaken thoroughly to ensure a good distribution of the catalyst through the liquid.

The solution was then isolated at ambient conditions for 20 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 135 kg/m$^3$, surface area 129 m$^2$/g, lambda initial 6 mW/mK, lambda air 19 mW/mK, critical pressure 30 mBar.

EXAMPLE 7

In a recipient, 3.48 grams of Reactol 255 were dissolved in 89.9 grams of acetone. To this mixture 6.52 grams of SUPRASEC X2185 were blended until a homogeneous solution was obtained. To this solution 0.130 mls of Dabco TMR were injected by means of a syringe. The recipient was closed air tight and shaken thoroughly to ensure a good distribution of the catalyst through the liquid.

The solution was then isolated at ambient conditions for 10 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 135 kg/m$^3$, surface area 67 m$^2$/g, lambda initial 6 mW/mK, lambda air 26 mW/mK, critical pressure 25 mBar.

EXAMPLE 8

In a recipient, 2.43 grams of Reactol 255 were dissolved in 89.8 grams of acetone. To this mixture 7.57 grams of SUPRASEC X2185 were blended until a homogeneous solution was obtained. To this solution 0.151 mls of Dabco TMR were injected by means of a syringe. The recipient was closed air tight and shaken thoroughly to ensure a good distribution of the catalyst through the liquid.

The solution was then isolated at ambient conditions for less than 5 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 135 kg/m$^3$, surface area 10 m$^2$/g, lambda initial 6 mW/mK, lambda air 38 mW/mK, critical pressure 10 mbar.

EXAMPLE 9

In a recipient, 1.79 grams of Reactol 100 were dissolved in 35.97 grams of acetone. To this mixture 2.201 grams of SUPRASEC X2185 were blended until a homogeneous solution was obtained. To this solution 0.029 mls of Dabco TMR were injected by means of a syringe. The recipient was closed air tight and shaken thoroughly to ensure a good distribution of the catalyst through the liquid.

The solution was then isolated at ambient conditions for 6 hours to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 125 kg/m$^3$, surface area 49 m$^2$/g.

EXAMPLE 10

In a recipient, 1.24 grams of Reactol 180 were dissolved in 36.0 grams of acetone. To this mixture 2.75 grams of a SUPRASEC X2185 were blended until a homogeneous solution was obtained. To this solution 0.037 mls of Dabco TMR were injected by means of a syringe. The recipient was closed air tight and shaken thoroughly to ensure a good distribution of the catalyst through the liquid.

The solution was then isolated at ambient conditions for 10 minutes to allow the formation of a sol gel.

Once the reaction was completed the sol gel was added to a pressure vessel, together with an acetone layer (to avoid evaporation out of the gel). Then the acetone was exchanged for liquid carbon dioxide. Subsequently the $CO_2$ was heated up until a supercritical status was obtained. After depressuration an aerogel was obtained having the following properties: density 122 kg/m$^3$, surface area 7 m$^2$/g.

EXAMPLE 11

In 95 g of acetone 5 g of SUPRASEC 2185 were dissolved. To this mixture 1 g Dabco TMR was added and the solution was left to gel.

A weak slurry was obtained which failed to be turned into an aerogel.

EXAMPLE 12

In 95 g of acetone 5 g of SUPRASEC 2185 were dissolved. To this mixture 0.04 g Dabco TMR was added and the solution was left to gel.

A solid precipitate was formed; no aerogel could be made.

EXAMPLE 13

In 93 g of acetone 7 g of SUPRASEC 2185 were dissolved. To this mixture 5 g Dabco TMR was added which resulted in the formation of a precipitate.

EXAMPLE 14

In 90 g of aceton 10 g of SUPRASEC 2185 were dissolved. To this mixture 0.2 g Dabco TMR was added which resulted in the formation of a weak sol-gel. This could not be supercritically dried.

EXAMPLE 15

10g of SUPRASEC 2185 were dissolved in 90 g of dichloromethane. 10 g of Dabco TMR was added hereto. A sol-gel could not be obtained; precipitation occured.

If less than 10 g catalyst is added a sol-gel is formed but cracks are formed and a monolith structure is not obtained.

EXAMPLE 16

10g of SUPRASEC 2185 were dissolved in 90 g of dichloromethane. 0.25 g of Dabco TMR were added hereto. The obtained sol-gel was supercritically dried.

The obtained aerogel had a density of 407 kg/m$^3$ and a surface area of 663 m$^2$/g.

The same experiment using 0.1 g of catalyst gave an aerogel with density 441 kg/m$^3$ and surface area 695 m$^2$/g.

EXAMPLE 17

A catalyst solution was prepared by blending subsequently 0.122 ml of Polycat 41 and 0.122 ml of Dabco TMR in 28.75 g of acetone (technical grade). The addition of the catalysts was done via a micrometer syringe. A second solution was prepared in two steps. First 3.67 g of the phenolic resin K1111 was dissolved in 70.0 g of acetone (technical grade) and subsequently 7.33 g of SUPRASEC DNR was added.

Both solutions were mixed thoroughly for a very short time (a few seconds) before they were blended together.

The obtained mixture was then left to stand for gelation and curing for 24 hours at room temperature.

From the obtained sol gel, a cylindrical monolith with a diameter of 40 mm and a height of 35 mm was transferred to a pressure vessel. This vessel was connected to a supercritical drying unit to induce the exchange process of the acetone for carbon dioxide. Subsequently, the carbon dioxide was removed at supercritical conditions.

An aerogel was formed with a density of 146 kg/m$^3$. Thermal performance of the obtained aerogel was measured in terms of thermal conductivity as a function of pressure. The results showed a low lambda value of 10 mW/mK up to a pressure of 100 mbar. The air-filled lambda value was 18 mW/mK.

I claim:

1. Method for preparing an organic aerogel comprising the steps of
   a) mixing an organic polyisocyanate, a (co)polymer containing at least one isocyanate-reactive group and an isocyanate trimerisation catalyst in a solvent,
   b) maintaining said mixture in a quiescent state for a period of time until said mixture forms a polymeric gel, and
   c) supercritically drying the obtained gel, wherein said (co)polymer is derived from ethylenically unsaturated monomers or is obtained by condensation of aldehydes or ketones or mixtures of aldehydes and ketones.

2. Method according to claim 1 wherein the isocyanate-reactive group is OH.

3. Method according to claim 1 wherein said monomers are selected from the group consisting of styrene, acrylic acid ester and hydroxyacrylic acid ester.

4. Method according to claim 1 wherein said (co)polymer is selected from the group consisting of phenolic resins, polyaldehyde-ketone resins, polyketones, novolaks and resols.

5. Method according to claim 1 wherein the (co)polymer is used in such an amount that the ratio between functional groups in the polyisocyanate and functional groups in the (co)polymer is between 1:1 and 10:1.

6. Method according to claim 1 wherein the aerogel has a density of 50 to 150 kg/m$^3$.

7. Method according to claim 1 wherein the organic polyisocyanate is diphenylmethane diisocyanate or polymethylene polyphenylene polyisocyanate.

8. Method according to claim 1 wherein the organic polyisocyanate is used in amounts ranging from 1.5 to 20% by weight based on the total reaction mixture.

9. Method according to claim 1 wherein the isocyanate trimerisation catalyst is a triazine derivative or a quaternary ammonium salt or a potassium carboxylate.

10. Method according to claim 1 wherein the polyisocyanate/catalyst weight ratio is between 10 and 100.

11. Method according to claim 1 wherein the solvent is acetone.

12. Method according to claim 1 wherein the solids content of the reaction mixture is between 5 and 15% by weight.

13. Method according to claim 1 wherein the time to form a polymeric gel in step b) ranges from 30 seconds to 1 hour.

14. Method according to claim 1 wherein the solvent is exchanged prior to supercritically drying the gel.

15. Method according to claim 14 wherein the solvent is exchanged into liquid carbondioxide.

16. Method according to claim 1 wherein a reinforcement material is incorporated in the reaction mixture.

17. An organic aerogel produced by the method according to claim 1.

18. Thermal or sound insulating material comprising the aerogel of claim 17.

* * * * *